Patented May 2, 1950

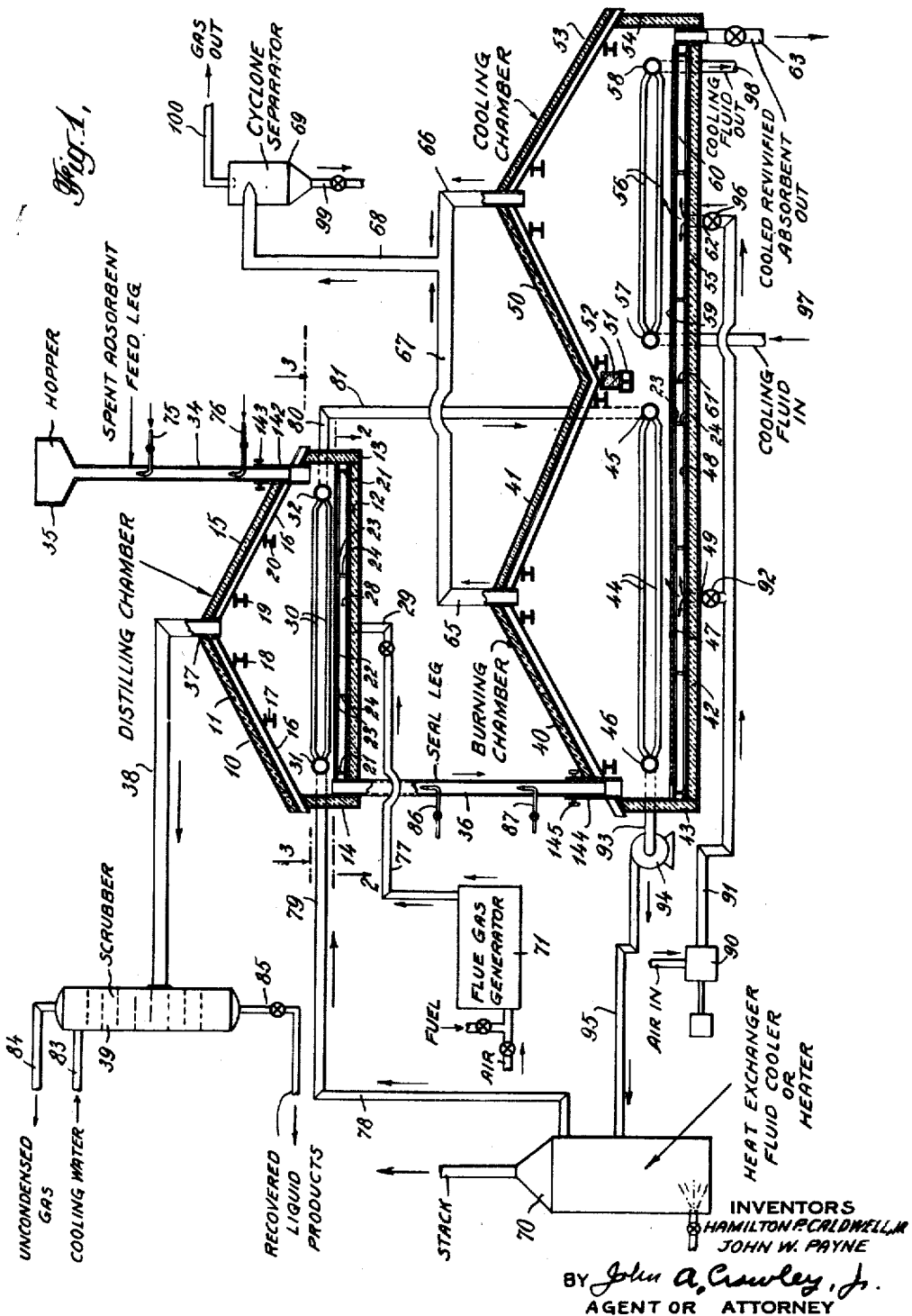

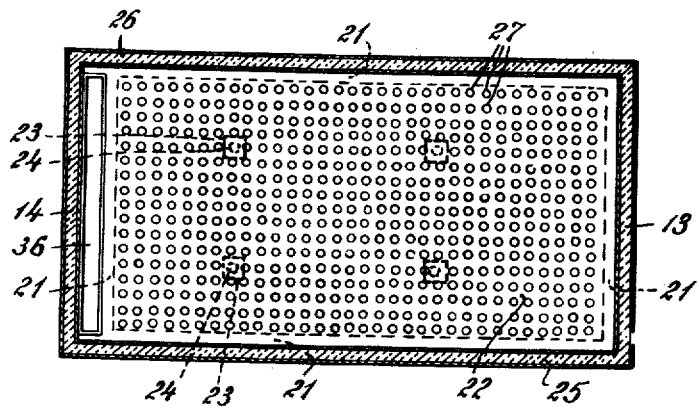
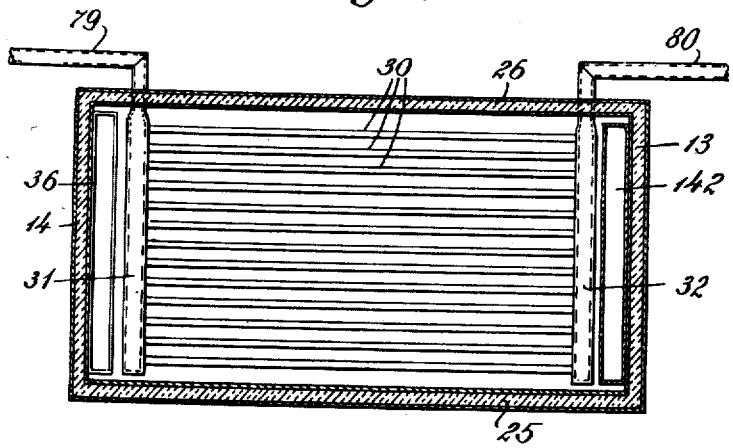
HAMILTON P. CALDWELL, JR.
JOHN W. PAYNE
INVENTORS

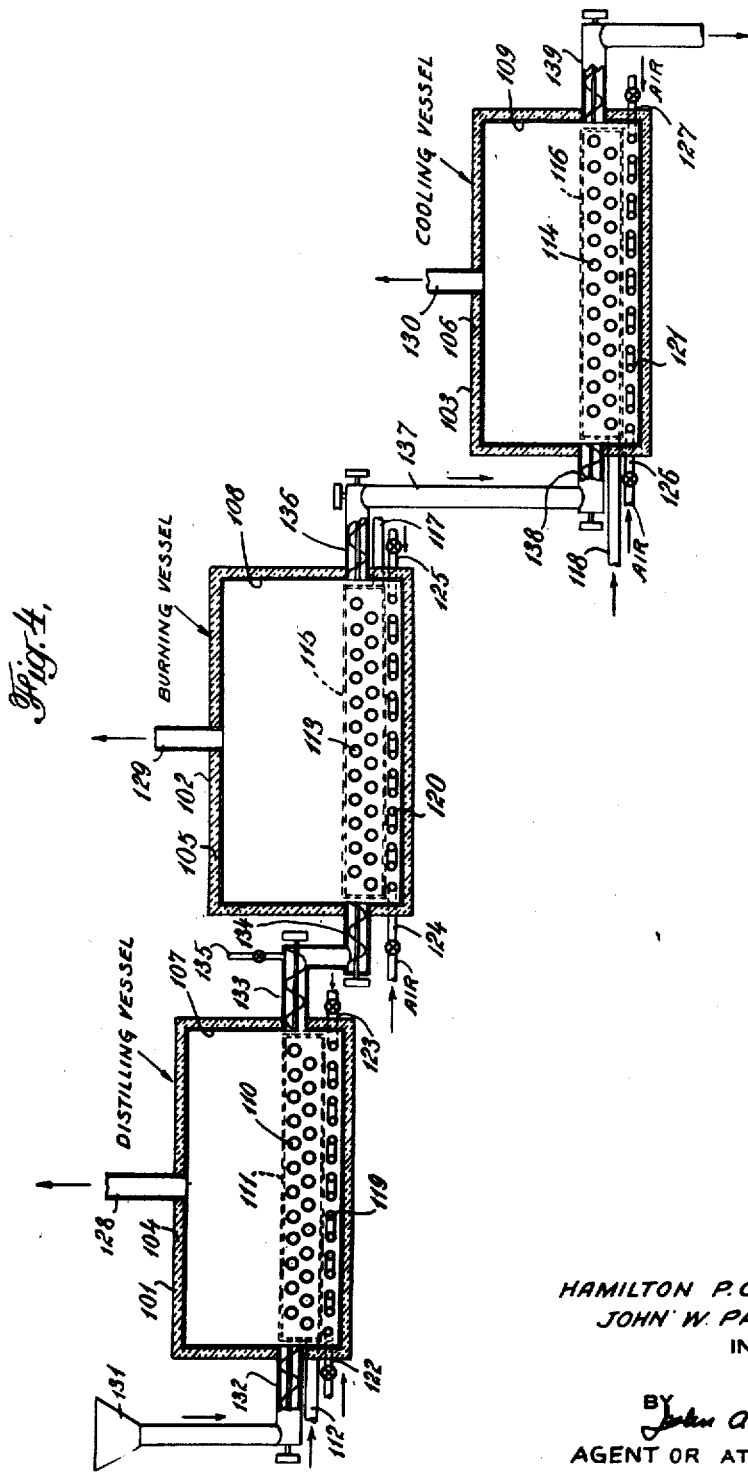

2,506,542

UNITED STATES PATENT OFFICE 2,506,542

METHOD AND APPARATUS FOR REGENERATION OF FINELY DIVIDED ADSORBENTS

Hamilton P. Caldwell, Jr., and John W. Payne, Woodbury, N. J., assignors to Socony-Vacuum Oil Company, Incorporated, a corporation of New York Application July 3, 1946, Serial No. 681,232

14 Claims. (Cl. 252—417)

This invention has to do with a method and apparatus for revivification of finely divided adsorbent materials which have become spent by deposition of a combustible contaminant thereupon. Such finely divided or pulverulent materials may become spent during use for a number of purposes such as use as a filter aid, use as a refining agent in sugar purification, use as a catalyst for conducting hydrocarbon conversions, and use as a decolorizing or purifying material in the refining of hydrocarbon oils. Such finely divided adsorbents may take the form of activated charcoals, bauxites, natural clay such as fuller's earth, treated clays, and synthetic associations of silica, alumina, or silica and alumina, commonly called gels.

The finely divided adsorbents to which this invention particularly pertains are adsorbents having a particle size falling within the broad range of about 100 mesh and finer and usually within the range of 200 mesh and finer by Tyler Standard Screen Analysis. It is with this meaning that the term "finely divided" is employed in describing and in claiming this invention.

Typical of the processes in which such pulverulent materials are employed is the contact clay treatment of hydrocarbon oils to effect decolorization and purification thereof. Such contact clay treatments are well known to the art and need not be further described herein. During the contact treatment of hydrocarbon oils, the finely divided clay gradually becomes spent by the deposition thereon of carbonaceous contaminants, some of which are of very high molecular weight and not easily vaporized. It is customary to wash such spent clay with petroleum naphthas for the purpose of removing occluded oil therefrom. The naphtha wash is followed by a steam purging in order to permit recovery of the wash naphtha. After this treatment, the contact clay may still contain a substantial amount of adsorbed naphtha and valuable hydrocarbon oils as well as non-vaporizable coky material. Its decolorizing efficiency after even only one use is substantially below that of the fresh clay and will decrease even further upon re-use. The revivification of such finely divided clays depends upon the removal of substantially all of the carbonaceous deposit therefrom without permitting the clay temperature to rise to a heat damaging level. Treatment of such spent clays with solvents has been proposed, but the economics of such solvent regeneration processes make such methods commercially impractical. It has also been proposed to regenerate the finely divided clays by burning in rotary kilns, but due to the high amount of carbonaceous deposits to be removed, the small particle size of the clay and the lack of adequate temperature control, such rotary kiln treatments result in the overheating of the clay to temperatures that permanently impair the decolorizing efficiency thereof, and the tendency for the clay particles to agglomerate, thereby rendering the clay practically valueless as a decolorizing and purifying agent for hydrocarbon oils. Attempts to regenerate spent finely divided contact clays by passage of the clay as a substantially compact downwardly gravitating column through a confined, vertical burning zone containing heat transfer tubes have proved unsatisfactory because of the inability to properly control the temperature of particles of such small diameter bearing the very high deposits of combustible material characteristic of spent contact clays and because of the tendency for the finely divided clay to cake and bridge thereby interfering with its flow and because of the tendency of both the air and clay streams to channel. As a consequence, when petroleum oils are decolorized and purified by means of finely divided contact clays, it has been common practice to discard the spent contact clay after the naphtha washing and steam purging thereof and to replace the discarded clay with new clay. This practice, made necessary by the inability to properly and economically regenerate finely divided adsorbents, has rendered an otherwise excellent method for refining petroleum oils economically unattractive both because of the high clay replacement cost and because of the loss of substantial quantities of valuable hydrocarbons deposited on the discarded clay.

A major object of this invention is the provision of a practical method for the controlled regeneration of finely divided adsorbent materials.

A specific object is the provision of a method for regeneration of finely divided contact clays which have become spent by use as decolorizing and purifying agents in hydrocarbon oil refining, which method not only permits satisfactory removal of contaminant deposits without the overheating of the clay but which also permits recovery of substantial amounts of the vaporizable constituents deposited upon the spent clay.

Another object is the provision of improved methods for providing uniform contacting between finely divided adsorbent particles and a gaseous material.

Another object is the provision in a process for regeneration of finely divided adsorbents bearing carbonaceous contaminants of a means for utilizing a substantial portion of the heat liberated in contaminant combustion for preheating the spent adsorbent to temperatures which will effect distillation of volatile contaminant constituents.

Another object is the provision in a process for regeneration of spent contaminant bearing finely divided adsorbents of a method and apparatus permitting the utilization of the heat requirements for preheating the adsorbent and for distilling vaporizable contaminant constituents as an aid in controlling the adsorbent temperature during combustion of the non-volatile contaminant constituents.

These and other objects of this invention will become apparent from the following description of the invention. Before proceeding with this description, several terms used in describing and in claiming this invention will be defined. The expressions "gas" or "gaseous material" are intended to mean that material existing in the gaseous phase under the particular operating conditions involved regardless of what may be the normal phase of that material at ordinary atmospheric conditions. The expression "vaporizable constituents" when applied to contaminant constituents deposited on the spent adsorbent is intended to mean those constituents which may practically be removed as gases either by simple vaporization or by virtue of decomposition or cracking when the spent adsorbent is subjected to temperatures of the order of 700–950° F. and the stripping effect of sufficient oxygen-free stripping gas to at least maintain the adsorbent in a fluidized condition. The expression "non-vaporizable constituents" is intended to mean those coky constituents remaining on the adsorbent after the above described treatment. The expression "fluidized condition" will be defined hereinafter. The expressions "heat damaging level" or "heat damaging temperature" are intended to mean temperatures which are high enough to cause substantial permanent impairment of the properties of the particular adsorbent involved which render it useful for the particular process in which it becomes spent. For example, in the process of hydrocarbon oil refining with contact clays, the properties involved are decolorizing and purifying properties. Several other terms used in claiming the invention are defined during the course of the description of the invention.

In a broad aspect the instant invention involves the passage of a finely divided adsorbent material serially through a distilling zone wherein it is heated in the absence of oxygen to a temperature sufficient to distil off the vaporizable contaminant constituents, a burning zone wherein the coky, non-vaporizable contaminant is burned and a cooling zone wherein the adsorbent is cooled. The adsorbent is passed through each zone as a horizontally moving bed which is maintained in a fluidized condition by the passage of a suitable gas upwardly therethrough. During its passage across each zone the fluidized mass is subjected to indirect heat transfer with a suitable heat exchange fluid. The gas employed for this purpose in the distilling zone is a substantially oxygen-free gas. The gas employed in the burning zone is an oxygen containing gas and the gas employed in the cooling zone may or may not contain oxygen. Certain other important aspects of this invention will be explained hereinafter.

The invention may be more readily understood by reference to the drawings attached hereto of which Figure 1 is an elevational view, partially in section, showing a preferred form of the invention, Figure 2 is a sectional view of one of the apparatus elements shown in Figure 1, taken at line 2—2 of Figure 1, Figure 3 is a sectional view of a different level in the same apparatus taken at line 3—3 of Figure 1, and Figure 4 is an elevational view, partially in section, of a modified form of the invention. All of these drawings are highly diagrammatic in form.

Turning now to Figure 1, there is shown a distilling chamber 10 which is, at its base, rectangular in cross-sectional shape and which is provided with a gable shaped roof 11. The floor and four sides of the distilling chamber are made up of refractory or insulating material which may consist of refractory bricks or which may consist of other types of insulating material enclosed in metal sheaths as shown. In the drawing the floor 12 and ends 13 and 14 of the chamber are visible. Also visible is the gable top roof 15 also made up of refractory bricks or metal encased insulating material. Refractory roofing material 15 is supported by upwardly sloping beams such as shown at 16 which are, in turn, supported by beams 17, 18, 19 and 20 and end walls 13 and 14. The supporting beams 17—20, inclusive, extend at least partially through opposite vertical walls of the chamber and are supported thereby. On the bottom 12 and extending along the four sides of the chamber are H beams or other suitable support members 21 which form a platform along the edges of the chamber upon which rests the foraminate or perforated partition 22. The partition 22 is further supported by a plurality of spaced-apart small, square, or rectangular plates 23 which are, in turn, supported from the chamber floor by a plurality of vertical rods 24 spaced at intervals under the partition 22. The arrangement may be better understood by reference to Figure 2 which is a sectional view taken at lines 2—2 in Figure 1.

In Figure 2, the four walls 13, 14, 25 and 26 of the vessel of the chamber may be seen. Also shown, is the partition 22 with perforations 27 uniformly distributed across its area. Also, indicated by dotted lines along the edge of the four walls, are the support beams 21, and also shown by dotted lines are the support plates 23 and rods 24. It will be readily understood that other suitable means for the support of the foraminate partitions 22 at a spaced interval above the floor of the vessel may be substituted for the construction shown. The purpose of the construction is to provide a gas inlet distributing space 28 which is fed by gas through an inlet pipe 29. The height of this chamber 28 may vary widely, depending upon depth of bed and rate of gas flow. The perforated partition 22 may take a number of forms, for example, it may take the form of a screen and it will be understood that the expressions "perforated partition" and "foraminate bottoms" as used in describing and claiming this invention are used in this broad sense. The perforations in the partition should, in general, be of such size as to prevent substantial flow of the particular adsorbent material involved therethrough. A gas outlet duct 37 is connected to the roof 11 of the chamber. The duct 37 connects into a withdrawal pipe 38 which conducts the gas into a scrubber 39. Above the partition 22 and within the chamber 10 are positioned a number of horizontal rows of horizontally extending spaced-apart tubes 30 connected between an inlet header 31 and an outlet header 32. The arrangement of these tubes may be more clearly seen from a study of Figure 3 which is a sectional view taken at line 3—3 of Figure 1, and wherein like elements bear like numerals. Extending upwardly from one end of chamber 10 is an elongated vertical adsorbent feed duct 34 provided with a feed hopper 35 at its upper end. The feed duct 34 extends into one end of the chamber 10 and is of such width as to extend horizontally across the width of the chamber. It has been found that the lower end of the duct 34 should terminate within the chamber 10 at the level at which it is desired to maintain the particles in the distilling chamber, which level is just above tubes 30. The desirable depth of the fluidized bed of adsorbent material to be maintained above the partition 22 will vary somewhat depending upon the required duration of treatment and may vary widely up to several feet in depth. However, due to the tendency of gas entering the fluidized bed from any particular distributing orifice, to "rat hole" or channel upwardly through the bed, in order to insure proper uniform fluidization of the entire bed it has been found that the bed must be at least sufficiently deep above the gas distributing partition 22 that the surface of the bed is above the level of intersection of lines drawn upwardly from adjacent gas inlet holes 27 in partition 22 at an angle roughly equal to the angle of internal flow of the adsorbent material. The angle of internal flow for clay type adsorbents generally lies within the range about 65-80 degrees with the horizontal. Broadly, it may be said that the bed of fluidized material should be maintained at a depth which is never less than about 2-4 times the distance between holes 27 in the partition 22. This adjustment of the bed depth may be easily controlled from the outside of chamber 10 during its operation by adjusting the level of end piece 142 which slides concentrically along the end of duct 34 and may be fixed at any level by set screws 143. Extending downwardly from the opposite end of the chamber 10 is an adsorbent outlet duct 36 similar in construction to the inlet duct 34. The lower end of duct 36 terminates within a burning chamber 40 which is positioned vertically below distilling chamber 10. An adjustable end piece 144 similar to end piece 142 is provided in the lower end of duct 36. The burning chamber 40 is similar in construction to the distilling chamber 10 but may be of somewhat greater horizontal length. Visible in the drawing, is the floor 42, one end 43, and the gable shaped roof 41, rows of horizontal heat transfer tubes 44 connected between inlet header 45 and outlet header 46, the perforated partition 47 supported a spaced distance above the floor 42 so as to provide a gas inlet distribution chamber 48 supplied with gas through inlet conduit 49. The lower end of the duct 36 which supplies adsorbent from distilling chamber 10 into burning chamber 40, i. e. end piece 144, should terminate above the level of tubes 44.

The lower section of the end of the chamber 40 which is opposite the adsorbent inlet end 43 is in communication with a cooling chamber 50 substantially along its entire width. A box beam 51 and refractory partition 52 serve to provide a wall across the upper section of the communicating ends of chambers 40 and 50 so that these chambers communicate only up to that level therein which is substantially filled during operation by adsorbent material so that substantial gas flow between chambers 40 and 50 is prevented. The lower end of the wall thus provided between chambers 40 and 50 should terminate just above the level of tubes 56, but should be below the terminating level of feed duct 36 to burning chamber. The cooling chamber 50 is similar in construction to distilling chamber 10. Visible in the drawing is the gable shaped roof 53, one end 54 of the floor section 55 which may, if desired, be merely a continuation of the floor of vessel 40 as is shown in the drawing. Also shown in the cooling chamber are rows of horizontally extending heat transfer tubes 56 connected between an inlet header 57 and an outlet header 58, and a perforated partition 59 providing a gas chamber 60 therebelow. The gas inlet chamber 60 of the cooling chamber is separated from the gas inlet chamber 48 of the burning vessel by means of partition 61 placed therebetween. A gas inlet 62 is provided for supply of gas into the chamber 60. The perforated partition 59 in vessel 50 may, if desired, consist of a continuation of the partition 47 of the burning chamber 40, as is shown in the drawing. An adsorbent outlet duct 63 which extends horizontally substantially across the width of chamber 50 is provided adjacent to end 54.

Gas outlets 65 and 66 extend upwardly from the roofs of chambers 40 and 50, respectively, and communicate through duct 68 to a cyclone dust separator 69. Also shown in the drawing of Figure 1 is a heat exchange fluid cooler or heater 70, which may be of conventional type, well known to the art, and a gas generator 71 which may also be of conventional construction. As an example of the operation of the apparatus arrangement described hereinabove, its application may be considered to the regeneration of a contact clay, which has become spent by utilization as a decolorizing and purifying agent in the refining of petroleum oil, such a spent contact clay may contain, as an example, about 1 to 3 per cent hydrocarbon oil boiling within the range 700° F. and upwards, 2 to 8 per cent non-volatile coking material and a certain amount of water. Spent adsorbent material usually existing at atmospheric temperature or at temperatures not substantially above 200° F., is distributed uniformly across one end of the partition 22 within the distilling chamber 10 by means of feeding duct 34. The duct 34 is maintained substantially full of adsorbent material and is of sufficient length so that when so filled it serves as a substantial seal against the escape of gas from chamber 10 therethrough. Inert gas, such as flue gas, may be introduced into the feed leg 34 at intervals through jets 75 and 76 so as to maintain the adsorbent in the leg in a fluffed and more flowable condition. A substantially oxygen free gas, such as flue gas manufactured in the generator 71 is conducted at a high temperature through conduit 77 into inlet conduit 29 and thence into the gas distributing chamber 28 below the partition 22 in chamber 10. The hot flue gas passes upwardly through all of the perforations in the partition 22 at a rate so controlled as to maintain the finely divided adsorbent material supplied onto partition 22 as a continuous uniformly fluidized bed extending entirely across the partition 22. In this fluidized condition, the individual adsorbent particles of the bed move around freely in a type of semi-suspended state so that the entire bed of finely divided adsorbent takes on flow characteristics which are substantially similar to those of a liquid fluid. The gas rate is slightly below that which would entrain substantial amounts of the finely divided particles from the chamber. The rate of gas flow required to obtain a fluidized condition of bed will vary depending upon the particle size and density of the particular adsorbent material involved. The proper rate of gas flow can be readily determined either by routine experiment or by equations published in the art and the fluidized condition may be readily recognized by the liquid flow properties immediately assumed by the adsorbent particles under these conditions. It is with the above meaning that the term "fluidized condition" is used in the describing and in the claiming of this invention. When the adsorbent bed within the chamber 10 has become fluidized, it moves freely horizontally across the chamber 10 and may be withdrawn from the opposite end of the chamber 10 through the drain duct 36. The height of the bed within the chamber 10 may be controlled by the control of the level of the lower end of duct 34. A suitable heat exchange fluid which may be heated in the heater 70 is conducted through conduits 78 and 79 into the inlet header 31 and then through the heat transfer tubes 30 within the distilling chamber. The heat exchange medium passes to outlet header 32 and is withdrawn therefrom through outlet conduits 80 and 81. Thus, by means of the heat exchange fluid passed through tubes 30 and, further, by means of the hot flue gas introduced through inlet 29, the adsorbent material is heated within the chamber 10 to a temperature suitable for the vaporization of the vaporizable constituents in the contaminant deposited upon the adsorbent. These vaporized constituents obtained both by straight distillation and by cracking down of heavier constituents are withdrawn along with the hot flue gas through outlet 37 and then passed through conduit 38 into the scrubber 39. The scrubber 39 may be of conventional construction, well known to the art, cooling water is introduced into the upper section thereof through conduit 83, uncondensed gas is withdrawn through conduit 84 at the top thereof and a mixture of water and recovered liquid hydrocarbon products is withdrawn through conduit 85 at the bottom thereof. The finely divided adsorbent containing non-vaporizable, coky constituents passes through vertical duct 36 onto the perforated partition 47 of burning chamber 40. The duct 36 is of such length that the column of adsorbent maintained therein serves as a seal to prevent substantial gas flow between chambers 10 and 40. An inert gas may be introduced through jets 86 and 87 into the leg 36 to fluff the adsorbent into a more flowable condition. A combustion supporting gas such as air may be introduced by means of a high pressure blower 90 through conduit 91 and inlet conduit 49 into the chamber 48 at a rate so controlled by valve 92 that the gas flowing upwardly through the perforations in the partition 47 is not only sufficient to supply the oxygen required for substantially complete combustion of the contaminant remaining upon the adsorbent material but is also sufficient to maintain the finely divided adsorbent as a continuous fluidized bed which extends entirely across the area of the partition 47. The height of the bed in burning chamber 40 is controlled by the level of the lower end of the inlet duct 36. The fluidized adsorbent bed passes substantially horizontally across the burning chamber and the temperature of the adsorbent is controlled by means of a heat exchange fluid circulated through the tubes 44. This heat exchange fluid may be supplied from a suitable external source, separate from the source of heat exchange fluid supply for the distilling chamber, or, in a more preferred form of the invention, the same heat exchange fluid may be employed. Thus, as is shown in Figure 1, the heat exchange fluid issuing through conduit 80 from the distilling chamber, having been cooled somewhat in said distilling chamber is passed through conduit 81 into the inlet header 45 serving the heat transfer tubes in the burning chamber 40. The fluid in passing through the tubes 44 picks up heat from the adsorbent in the burning chamber and is withdrawn through header 46 from conduit 93 into the pump 94 by which it is pumped via conduit 95 back to the heater 70 wherein its temperature is adjusted to a level suitable for charge back to the heat transfer tubes in the distilling chamber. In this manner, the heat of contaminant combustion released in the burning chamber 40 is made available for heating the incoming spent adsorbent in the distilling chamber 10 and for distilling from the adsorbent the vaporizable contaminant constituents. At the same time, the heat required for heating the incoming spent adsorbent and for distilling vaporizable contaminant constituents is utilized as an aid in controlling the adsorbent temperature during the combustion of the non-volatile contaminant in the burning chamber 40. If the heat required for heating the adsorbent and distilling the vaporizing contaminant constituents is less than that recoverable from contaminant burning then the heater 70 is used as a cooler by the passage of cold air therethrough. The regenerated finely divided adsorbent still moving as a fluidized bed passes from the burning chamber 40 into the communicating cooling chamber 50 through which it flows in a horizontal direction while being cooled by means of a cold gas such as air or flue gas introduced through inlet conduit 62 at a rate so controlled by valve 96 that the bed is maintained in a fluidized condition. Additional heat may be removed from the adsorbent, when necessary, by the circulation of a suitable heat exchange fluid through the heat transfer tubes 56. This fluid may be introduced through conduit 97 to the inlet header 57 and withdrawn from outlet header 58 through conduit 98. The heat exchange fluid passed through the heat transfer tubes in any of the chambers may take any of a number of forms. For example, it may consist of a low melting point metallic alloy or of certain mixtures of fused inorganic salts such as a mixture of the salts of potassium nitrate and nitrite. On the other hand, the heat exchange fluid may take the form of a gas such as steam or air usually circulated under pressure.

The flue gas from the burning chamber 40 and the gas from the cooling chamber 50 are withdrawn from the upper ends of said chambers through ducts 65 and 66, respectively, and then passed through conduits 67 and 68 into the cyclone dust separator 69 wherein any entrained adsorbent material is separated from the gas and removed from the separator through conduit 99. The substantial dust free gas passes from the upper end of the separator through conduit 100. In conducting the operation above described it has been found that a greater uniformity of inlet gas distribution into the finely divided adsorbent bed may be obtained in any of the chambers by the maintenance on the bottom of the chamber—i. e., on the perforated partition, of a fixed bed of particle form solid material having a substantially larger particle size range than the finely divided adsorbent. For example, in a process for regeneration of adsorbent particles falling within the size range of about 200–400 mesh by Tyler Standard Screen Analysis. A suitable particle size for the fixed bed is of the order of 8 to 100 mesh. The depth of the fixed bed on the perforated partitions should be at least equal to about half the distance between gas inlet holes 27 in partition 22. Beds of coarse material, having a depth up to about four times the distance between holes 27 in partition 22, are satisfactory. In operation, due to the larger particle size of the solid material in the fixed bed, the gas rates employed to fluidize the bed of finely divided adsorbent are not sufficiently great to fluidize the fixed bed. Thus, the fixed bed serves as a highly efficient means for uniformly distributing the incoming gas to all sections of the cross section of the fluidized bed of finely divided adsorbent. The material used for the fixed bed may be adsorbent material of the same nature as the finely divided adsorbent which is being regenerated, or it may take the form of an inert refractory material or even of particles of metallic material.

It will be understood that the construction of the distilling, burning and cooling chambers and of the means for introducing adsorbent thereinto may take a number of modified forms all within the scope of this invention. Such a modified form is shown in Figure 4 wherein is shown distilling, burning and cooling vessels 101, 102 and 103, respectively, of substantially rectangular cross-sectional shape and having flat roofs 104, 105 and 106, respectively. The roofs and side walls of these vessels are made up of refractory material, and metallic internal linings 107, 108 and 109 are provided within the vessels 101, 102 and 103, respectively. Looking at the distilling vessel 101 it will be found that rows of heat transfer tubes are provided therein, extending horizontally thereacross in a direction transverse to the length of the vessel. The heat exchange tubes 110 are supplied in parallel with heat exchange fluid from a common rectangular shaped external manifold indicated by the dotted lines 111, and which manifold is supplied through conduit 112. A similar outlet manifold box and outlet conduit therefrom (not shown) are provided on the opposite side of the distilling vessel. Similar heat transfer tubes 113 and 114, inlet manifold boxes 115 and 116, and inlet conduits 117 and 118 are provided for vessels 102 and 103, respectively. It will also be seen from Figure 4 that in place of the perforated partitions employed in the apparatus construction of Figure 1 for gas distribution, in the vessels 101, 102 and 103, there are provided along the bottoms thereof a horizontal row of gas inlet tubes 119, 120 and 121, respectively, extending horizontally across said vessels in a direction perpendicular to the plane of the drawing. Adjacent tubes 119 in vessel 101 are connected together in such a manner as to form two banks of tubes in series, one bank being supplied by the inlet conduit 122 and the other bank being supplied by the inlet conduit 123; and the last tube in each bank—i. e., the one located near the center of the vessel, being closed on one end. Perforations are provided along the lower side of the tubes to permit the gas introduced thereinto to pass upwardly through the vessel. A similar arrangement is provided for the tubes 120 and 121 in vessels 102 and 103, respectively, gas inlets 124 and 125 being provided for tubes 120 and inlets 126 and 127 being provided for tubes 121.

It will be understood that other arrangements of these gas inlet tubes and means for introduction of gas thereinto, which will be readily apparent to those skilled in the art, are contemplated as being within the scope of this invention. Gas outlets 128, 129 and 130 are provided at the tops of vessels 101, 102 and 103, respectively. Finely divided adsorbent material may be introduced into the distilling vessel 101 from hopper 131 by means of a screw conveyor 132 which may be driven by conventional means. The adsorbent flows horizontally across the distilling chamber 101 as a uniformly fluidized bed in the same manner as described for the apparatus of Figure 1 and is withdrawn from the opposite end of the vessel 101 by means of a screw conveyor 133. It will be understood that, in order to effect the uniform inlet distribution of adsorbent across the entire width of the distilling vessel and in order to effect uniform withdrawal of adsorbent from across the entire width thereof, horizontal rows of spaced-apart screw conveyors may be employed for adsorbent introduction and withdrawal. The adsorbent from the screw conveyor 133 drops into the screw conveyor 134 by which it is introduced into the burning vessel 102. An inert gas may be introduced at 135, if desired, to improve the seal between the vessels 101 and 102. The adsorbent passes horizontally across the vessel 102 as a fluidized bed and is withdrawn from the opposite end thereof through screw conveyor 136 from which it may be conducted, via conveyor 137, into the screw conveyor 138 feeding the cooling vessel. Cooled adsorbent is withdrawn from the opposite end of the cooling vessel by means of screw conveyor 139. The operation of the distilling, burning and cooling vessels and the heat exchange fluid systems and gas handling systems in the apparatus arrangement shown in Figure 4 may be similar to that already described in Figure 1. If desired, a fixed bed of solid particles of larger size range than the finely divided adsorbent may be maintained along the bottoms of vessels 101, 102 and 103, in which case the depth of the bed should be such as to provide a fixed bed depth above the gas inlet tubes 119, 120 and 121 of at least one-half the distance between orifices in said tubes.

It has been found that by the passage of finely divided adsorbent material as a continuous fluidized horizontally moving bed through zones provided with properly spaced heat transfer tubes a degree of adsorbent temperature control may be obtained which is far superior to what would be expected upon the basis of previous results wherein the adsorbent contacts heat transfer surfaces as a substantially compact flowing column of finely divided adsorbent. As a result, finely divided adsorbent materials containing very high contaminant deposits may be satisfactorily regenerated by the method of this invention without overheating of the adsorbent to heat damaging levels. Moreover, by the passage of heat exchange fluid in series through tubes in the distilling and burning zones a considerable reduction of heating and cooling costs is effected. It has further been found that operation according to the method of this invention permits the movement of the finely divided adsorbent through the distilling, burning and cooling steps without channeling or bridging or caking of the solid material, and permits a uniformity of gas-solid contact not heretofore obtained. The maintenance of fixed beds of substantially larger particles along the bottoms of the distilling, burning and cooling vessels has been found to greatly improve the uniformity of gas admission and the uniformity of gas-solid contacting.

The rate of solid flow through the several chambers may be largely controlled by the rate of withdrawal therefrom. In the arrangement shown in Figure 1, the rate of cooled regenerated solid withdrawal from the cooling chamber 50 may control the rate of solid flow through all the chambers.

The temperature maintained in the several chambers will depend somewhat upon the particular type of contaminant deposit which is to be removed from the adsorbent and upon the characteristic heat damaging temperature of the adsorbent. In the regeneration of contact clays used for hydrocarbon oil refining the temperature in the distilling chamber may fall within the range about 750-950° F., the temperature in the burning chamber within the range about 750-1200° F., and the cooled adsorbent issuing from the cooling chamber may be at any desired temperature ranging from substantially atmospheric temperature upwards.

It will be understood that the particular details of apparatus design and arrangement and examples of operation and of the applications of this invention are intended as illustrative and are not to be construed as limiting the scope of this invention except as it may be limited by the following claims.

We claim:

1. The method for revivifying finely divided adsorbent materials bearing carbonaceous deposits which method comprises: passing a continuous stream of said finely divided contaminant bearing adsorbent in a substantially horizontal direction through an elongated confined distilling zone wherein it is heated by indirect heat transfer with a suitable heating fluid to a temperature suitable for vaporization of the vaporizable constituents of said contaminant, passing a substantially oxygen-free gas upwardly through said stream transversely to its direction of flow at a rate sufficient to maintain said adsorbent in a fluidized condition and to strip said vaporizable constituents from said adsorbent, withdrawing said oxygen-free gas and stripped vaporizable constituents from the upper section of said distilling zone, passing said stream adsorbent from said distilling zone through a separate burning zone in a substantially horizontal direction while passing a suitable heat exchange fluid in indirect heat transfer relationship therewith to control the temperature of said adsorbent at a temperature range suitable for combustion of said contaminant and below a heat damaging level, passing an oxygen containing gas upwardly through said stream in said burning zone in a direction transverse to the flow of said stream and at a rate sufficient to maintain said adsorbent in said burning zone in a fluidized condition and to effect substantially complete combustion of the contaminant remaining on said adsorbent, withdrawing flue gas from the upper section of said burning zone, passing said stream of adsorbent from said burning zone through a communicating cooling zone in a substantially horizontal direction while passing a low temperature gas which is inert to the adsorbent upwardly through said stream in said cooling zone in a direction transverse to the flow of said stream at a rate sufficient to maintain said adsorbent in said cooling zone in a fluidized condition and withdrawing cooled revivified adsorbent from said cooling zone.

2. The method for revivifying finely divided adsorbent materials bearing carbonaceous deposits which method comprises: passing a continuous stream of said finely divided contaminant bearing adsorbent in a substantially horizontal direction through an elongated, confined distilling zone wherein it is heated by indirect heat transfer with a suitable heating fluid to a temperature suitable for vaporization of the vaporizable constituents of said contaminant and to a temperature suitable for subsequent initiation of residual contaminant combustion, passing a substantially oxygen-free gas upwardly through said stream transversely to its direction of flow at a rate sufficient to maintain said adsorbent in a fluidized condition and to strip said vaporizable constituents from said adsorbent, withdrawing said oxygen-free gas and stripped vaporizable constituents from the upper section of said distilling zone, passing said stream of adsorbent from said distilling zone through a separate burning zone in a substantially horizontal direction while passing a suitable cooling fluid in indirect heat transfer relationship therewith to maintain said adsorbent below a heat damaging level, passing an oxygen containing gas upwardly through said stream in said burning zone in a direction transverse to the flow of said stream and at a rate sufficient to maintain said adsorbent in said burning zone in a fluidized condition and to effect substantially complete combustion of the contaminant remaining on said adsorbent, withdrawing flue gas from the upper section of said burning zone, passing said stream of adsorbent from said burning zone substantially horizontally through an elongated confined cooling zone wherein it is cooled by indirect heat transfer with a suitable cooling fluid, passing a gas, inert to said adsorbent, upwardly through said stream in said cooling zone in a direction transverse to the flow of said stream at a rate sufficient to maintain said adsorbent in said cooling zone in a fluidized condition and withdrawing cooled revivified adsorbent from said cooling zone.

3. The method of claim 1 further characterized in that the contaminant bearing adsorbent is supplied into one end of said distilling zone from a column of said adsorbent of substantial height, said column providing a gas seal, and in that said adsorbent is passed downwardly from the opposite end of said distilling zone as a second confined column into one end of said burning zone, said second column providing a seal against gas flow between said distilling and burning zones.

4. The method for regenerating a finely divided contact clay, which has been employed for the decolorization of hydrocarbon oils which method comprises: feeding said finely divided contact clay bearing a carbonaceous contaminant deposit into one end of a substantially horizontal distilling zone from an upwardly extending seal column of said clay, flowing said clay as a continuous fluidized bed of much greater horizontal than vertical dimensions substantially horizontally through said distilling zone while introducing an oxygen-free gas through a plurality of openings distributed uniformly over the bottom of said zone and passing it upwardly through said bed at a rate sufficient to maintain it in a fluidized condition, passing a suitable heating fluid in indirect heat transfer relationship with said clay in distilling zone to heat it to a temperature suitable to distil off the vaporizable constituents of said contaminant and to a temperature suitable for initiation of the combustion of the non-vaporizable constituents, withdrawing the distilled contaminant constituents and said oxygen-free gas from the top of said distilling zone, withdrawing said clay from the end of said zone opposite the end of clay inlet as a downwardly extending seal column and directing the clay from the lower end of said seal column into one end of a substantially horizontal, elongated regeneration zone, flowing said clay as a continuous fluidized bed of much greater horizontal dimensions than its vertical dimension substantially horizontally through said regeneration zone while introducing an oxygen-containing gas through a plurality of openings distributed uniformly over the bottom of said zone and passing it upwardly through said bed in said regeneration zone at a rate sufficient to maintain it in a fluidized condition and to burn off substantially all of the contaminant remaining on said clay flowing from said distilling zone, passing a suitable cooling fluid in indirect heat transfer relationship with said clay in said regeneration zone to maintain the temperature of said clay below a heat damaging level, withdrawing regeneration gas from the top of said regeneration zone, continuing the flow of said fluidized bed of clay from the end of said regeneration zone opposite the clay inlet through a communicating horizontally extending cooling zone while introducing a suitable gas through a plurality of openings distributed uniformly over the bottom of said zone and passing it upwardly through the bed in said cooling zone at a rate sufficient to maintain it in a fluidized condition, passing a suitable cooling fluid in indirect heat transfer relationship with the clay in said cooling zone and downwardly withdrawing cooled, regenerated clay from the end of said cooling zone opposite its inlet; wherein said first named seal column is of sufficient height to promote the flow of said fluidized bed of clay through said distilling zone and said last named seal column is of sufficient height to promote the flow of said fluidized bed of clay through said regeneration and cooling zones.

5. The method of claim 4 characterized in that the depth of said fluidized bed in said distilling, regeneration and cooling zones is greater than two times the distance between adjacent openings for gas introduction in the bottom of said zones.

6. The method of claim 4, characterized in that the depth of said fluidized bed in said distilling, regeneration and cooling zones is greater than the tangent of the angle of internal flow of said finely divided fluidized contact clay times the distance between adjacent openings for gas introduction in the bottom of said zones, wherein the angle of internal flow of the contact material lies within the range 65-80 degrees with the horizontal.

7. The method for revivifying finely divided adsorbent materials bearing carbonaceous deposits which method comprises: passing a continuous stream of said finely divided contaminant bearing adsorbent in a substantially horizontal direction through an elongated, confined distilling zone over a fixed bed of solid particles maintained over the bottom of said distilling zone, said fixed bed being made up of particles of substantially larger size range than said finely divided adsorbent, heating said adsorbent passing through said distilling zone to a temperature suitable to distill vaporizable contaminant constituents from said adsorbent and to a temperature suitable for subsequent initiation of combustion of the residual non-vaporizable contaminant constituents by passing a suitable heating fluid in indirect heat transfer relationship therewith, passing a suitable oxygen-free gas upwardly through said fixed bed and through said adsorbent stream at a rate sufficient to maintain said adsorbent in a fluidized condition but insufficient to fluidize said fixed bed of solid particles, withdrawing said oxygen-free gas and distilled contaminant from said distilling zone at a level above the surface of said adsorbent stream, passing said stream of adsorbent from said distilling zone substantially horizontally through a separate, elongated regeneration zone over a fixed bed of solid particles maintained in the bottom of said regeneration zone, said bed being similar to the one in said distilling zone, passing an oxygen containing gas upwardly through said fixed bed and said adsorbent stream in said regeneration zone at a rate sufficient for substantially complete combustion of residual contaminant on said adsorbent and to maintain said adsorbent in a fluidized condition but insufficient to fluidize said fixed bed, withdrawing flue gas from said regeneration zone above the level of said adsorbent stream therein, passing said stream of adsorbent from said regeneration zone in a substantially horizontal direction over a fixed bed of solid particles in a communicating cooling zone said last named fixed bed being similar to the fixed beds in said distilling and regeneration zones, passing a suitable low temperature gas upwardly through said fixed bed and said adsorbent stream in said cooling zone at a rate sufficient to maintain said stream in a fluidized condition but insufficient to fluidize said fixed bed, and withdrawing cooled, regenerated adsorbent from said cooling zone.

8. The method for revivifying a finely divided adsorbent material bearing a carbonaceous contaminant which method comprises: passing said adsorbent serially through a distilling zone, a regeneration zone and a cooling zone through each of which zones it flows in a horizontal direction as a uniformly fluidized bed, passing substantially oxygen-free gas upwardly through the bed of said adsorbent in said distilling zone at a rate sufficient to maintain said bed in a fluidized condition and to strip vaporizable constituents of the contaminant from said adsorbent, passing an oxygen containing gas upwardly through the bed of adsorbent in said regeneration zone at a rate sufficient to maintain said bed in a fluidized condition and to burn substantially all the remaining contaminant from said adsorbent, passing a low temperature gas which is inert to said adsorbent upwardly through the bed of adsorbent in said cooling zone at a rate sufficient to maintain said bed in a fluidized condition, passing a heat exchange fluid in indirect heat transfer relationship with the fluidized bed of adsorbent in said distilling chamber to heat said adsorbent to a temperature suitable to distill off the vaporizable constituents of the contaminant, passing the heat exchange fluid from said distilling zone in indirect heat transfer relationship with said fluidized bed of adsorbent in said regeneration zone to maintain the temperature of the regenerating adsorbent at a level sufficiently high for contaminant combustion but below a heat damaging level, and returning the heat exchange fluid from said regeneration zone back into indirect heat transfer relationship with the adsorbent in said distilling zone.

9. An apparatus for regeneration of finely divided adsorbent materials bearing carbonaceous contaminants which apparatus comprises: in combination a substantially horizontal, stationary distilling chamber, members defining a gas distributing manifold along the bottom of said chamber, said manifold having gas apertures therein opening into said chamber, said apertures being uniformly distributed over the horizontal cross-sectional area of said chamber, a conduit for solid material introduction extending into said chamber, from an external source, said conduit having its delivery end positioned near one lateral end of said chamber within the lower section thereof but spaced substantially above the bottom of said chamber, a solid material outlet near the opposite lateral end of said chamber, conduit means connecting said manifold for gas supply thereto, a separate external receiving vessel for receiving vapors from said distilling chamber, a conduit connected between said receiving vessel and the upper section of said distilling chamber for passage of distilled vapors, a plurality of uniformly spaced apart heat transfer tubes extending along the lower section of said distilling chamber at a level below the discharge end of said solid inlet conduit but above said gas distributing manifold, means to pass a heat exchange fluid through said tubes, a substantially horizontal, elongated, stationary burning chamber, members defining a gas distributing manifold along the bottom of said burning chamber, said manifold having gas apertures therein opening into said chamber, said apertures being uniformly distributed over the horizontal cross-sectional area of said chamber, conduit means connecting to said manifold for gas supply thereto, a gas outlet conduit connected to the top of said burning chamber communicating it with an external location other than said receiving chamber, conduit means connected between said solid outlet on said distilling chamber and one lateral end of said burning chamber, said conduit means having its discharge end positioned within the lower section of said burning chamber substantially above the bottom thereof, a plurality of spaced apart heat transfer tubes uniformly distributed across the lower section of said burning chamber below the level of the discharge end of said conduit means but above said gas distributing manifold, means to pass a cooling fluid through said tubes a substantially horizontal, elongated, stationary cooling chamber, a gas distributing manifold along the bottom of said cooling chamber, said manifold having a plurality of gas apertures opening within said chamber and uniformly distributed over its horizontal cross-sectional area, conduit means connecting to said manifold for gas supply thereto, a gas outlet conduit connected to the top of said cooling chamber communicating it with an external location other than said receiving chamber, members defining a restricted passage for solid flow from the end of said burning chamber opposite the end of solid material supply thereto into one lateral end of said cooling chamber, and a solid material outlet conduit connected to said cooling chamber near the opposite end thereof.

10. An apparatus for regeneration of finely divided adsorbent materials bearing carbonaceous contaminant which comprises: a substantially horizontal, elongated, stationary distilling chamber, a similar burning chamber and a similar cooling chamber, a separate gas distributing manifold positioned along the bottom of each of said chambers, said manifold having a plurality of gas apertures therein distributed uniformly over the horizontal cross-sectional area of the chamber, a separate conduit connecting into each of said manifolds for gas supply, a gas outlet conduit connected through the top of each of said burning and cooling chambers, a separate external receiving chamber for receiving distilled vapors from said distilling chamber, said receiving chamber being completely isolated from said burning and cooling chambers, a conduit connected between said receiving chamber and the top of said distilling chamber to communicate said chambers, a separate set of spaced heat transfer tubes distributed uniformly across the bottom of each of said chambers above the gas distributing manifold, separate inlet conduit means and outlet conduit means for heat exchange fluid flow associated with the set of heat transfer tubes in said cooling chamber, a conduit connecting one end of the set of tubes in the burning chamber to one end of the set of tubes in the distilling chamber and conduit means communicating together the opposite ends of said sets whereby a closed circuit is provided through which a heat exchange fluid may be passed cyclically, a circulating device in said closed circuit for circulating the heat exchange fluid cyclically through said sets of heat transfer tubes in said distilling and burning chambers, a conduit for solid material introduction extending into one lateral end of said distilling chamber, having its discharge end in the lower section of said distilling chamber but spaced substantially above the gas distributing manifold therein, conduit means communicating the opposite end of said distilling chamber with one lateral end of said burning chamber, said conduit means having its delivery and discharge ends in the lower section of said distilling chamber and burning chambers, respectively, but spaced substantially above the gas distributing manifolds therein, members defining a restricted passage for solid flow between the opposite end of said burning chamber and one end of said cooling chamber, said passage communicating the lower section of each of said last named chambers, a solid material outlet conduit connected to the opposite end of said cooling chamber at a level within the lower section thereof.

11. An apparatus for regeneration of finely divided adsorbent materials bearing carbonaceous contaminants which apparatus comprises: in combination a substantially horizontal, stationary distilling chamber, members defining a gas distributing manifold along the bottom of said chamber, said manifold having gas apertures therein opening into said chamber, said apertures being uniformly distributed over the horizontal cross-sectional area of said chamber, a separate external receiving vessel for receiving vapors from said distilling chamber, a conduit connected between said receiving vessel and the upper section of said distilling chamber for passage of distilled vapors, a plurality of uniformly spaced apart heat transfer tubes extending along the lower section of said distilling chamber above said gas distributing manifold, means to pass a heat exchange fluid through said tubes, an elongated upwardly extending feed duct connecting into one lateral end of said distilling chamber, said duct terminating on its lower end within the lower section of said chamber a spaced distance above the bottom of said chamber and extending horizontally across the entire width of said chamber, a substantially horizontal elongated stationary burning chamber positioned elevationally below said distilling chamber, members defining a gas distributing manifold along the bottom of said burning chamber, said manifold having gas apertures therein opening into said chamber, said apertures being uniformly distributed over the horizontal cross-sectional area of said chamber, conduit means connecting to said manifold for gas supply thereto, a gas outlet conduit connected to the top of said burning chamber communicating it with an external location other than said receiving chamber, a substantially vertical duct for solid material flow connected between that end of said distilling chamber opposite the solid feed duct and one lateral end of said burning chamber, said duct terminating on its upper end within the lower section of said distilling chamber a substantial distance above the gas distributing manifold therein and terminating on its lower end within the lower section of said burning chamber a spaced distance above the gas distributing manifold therein and said duct extending substantially the width of said chambers on its ends, a plurality of spaced apart heat transfer tubes uniformly distributed across the lower section of said burning chamber below the level of the discharge end of said duct but above said gas distributing manifold, means to pass a cooling fluid through said tubes a substantially horizontal, elongated, stationary cooling chamber positioned substantially on the same level as said burning chamber and communicating therewith substantially across the entire width of the lower portion of the end thereof opposite the solid supply duct to said burning chamber, duct means connecting through the bottom of said cooling chamber on its opposite end and flow throttling means associated with said last named duct means, a gas distributing manifold along the bottom of said cooling chamber, said manifold having a plurality of gas apertures opening within said chamber and uniformly distributed over its horizontal cross-sectional area, conduit means connecting said manifold for gas supply thereto, and a gas outlet conduit connected to the top of said cooling chamber communicating it with an external location other than said receiving chamber.

12. An apparatus for regeneration of finely divided adsorbent materials bearing carbonaceous contaminant which comprises: a substantially horizontal elongated stationary distilling chamber, an elongated horizontal burning chamber positioned vertically below said cooling chamber and an elongated horizontal cooling chamber positioned on the same level as said burning chamber and communicating therewith substantially across the entire lower portion of one end, a perforated partition extending substantially horizontally across each one of said chambers shortly above its bottom to define a gas distributing space along the bottom of said chamber, a separate gas inlet conduit for the distributing space in each of said chambers, a separate receiving chamber for receiving hydrocarbon vapors distilled in said distilling chamber, a conduit for vapor flow connected between the top of said distilling chamber and said receiving chamber, separate gas outlet conduits connected into the tops of said burning and distilling chambers, a set consisting of a plurality of spaced heat exchange tubes extending substantially horizontally across said distilling chamber shortly above said partition therein, a heat exchange fluid supply conduit and a heat exchange fluid withdrawal conduit communicating with said set of tubes, a similar set of tubes similarly positioned in said burning chamber and inlet and outlet conduits communicating with said last named set of tubes, an upwardly extending feed duct extending down into said distilling chamber near one lateral end thereof and terminating on its lower end a substantial distance above the bottom of said chamber, an adjustable end piece on the lower end of said duct adapted to slide up and down, whereby the effective discharge level of said duct within the lower section of said distilling chamber may be adjusted, a vertical duct connected between a location in said distilling chamber near its opposite end and a location within said burning chamber near the lateral end thereof which is opposite the end communicating with said cooling chamber, said duct terminating on its upper end above the level of said perforated partition in said burning chamber and terminating on its lower end a substantial distance above said perforated partition therein, an adjustable end piece on the lower end of said last named duct adapted to permit external adjustment of the discharge level of said duct above the perforated partition within the lower section of said burning chamber, an outlet duct connecting through the bottom of said cooling chamber near the lateral end thereof opposite the end of communication with said burning chamber, and a flow throttling device on said outlet duct.

13. An apparatus for regeneration of finely divided adsorbent materials bearing carbonaceous contaminant which comprises: a substantially horizontal elongated stationary distilling chamber, a similar burning chamber and a similar cooling chamber, a separate gas distributing manifold consisting of spaced perforated pipes distributed uniformly over the bottom of each of said chambers, separate gas inlet conduit means to each of said manifolds, a separate gas outlet conduit connected through the top of each of said burning and cooling chambers, a vapor receiving chamber isolated from said burning and cooling chambers and communicated by means of a conduit with the upper section of said distilling chamber, a separate set of spaced heat transfer tubes distributed uniformly across the bottom of each of said chambers above the gas distributing manifold, separate inlet conduit means and outlet conduit means for heat exchange fluid flow associated with the set of heat transfer tubes in each of said chambers, a mechanical feed device for solid material injection connected into one lateral end of said distilling chamber at a level not substantially above that of said heat transfer tubes but above that of the gas distributing manifold therein, a gas tight mechanical solid material conveying device connected between the opposite lateral end of said distilling chamber and one lateral end of said burning chamber said device connecting into said distilling and burning chambers at levels above the gas distributing manifold and not substantially above the heat transfer tubes in said chambers, a pipe for inert gas supply into said last named conveying device, a similar mechanical conveying device connected between the opposite lateral end of said burning chamber and said cooling chamber and connecting into said chambers at similar levels to said first named conveying device, and a mechanical discharge device connecting into the opposite lateral end of said cooling chamber at a level above said gas distributing manifold but not substantially above the heat transfer tubes therein.

14. An apparatus for regeneration of finely divided adsorbent materials bearing carbonaceous contaminant which comprises: a substantially horizontal elongated stationary distilling chamber, an elongated horizontal burning chamber positioned vertically below said cooling chamber and an elongated horizontal cooling chamber positioned on the same level as said burning chamber and communicating therewith substantially across the entire lower portion of one end, a perforated partition extending substantially horizontally across each one of said chambers shortly above its bottom to define a gas distributing space along the bottom of said chamber, a separate gas inlet conduit for the distributing space in each of said chambers, a separate receiving chamber for receiving hydrocarbon vapors distilled in said distilling chamber, a conduit for vapor flow connected between the top of said distilling chamber and said receiving chamber, separate gas outlet conduits connected into the tops of said burning and distilling chambers, a set consisting of a plurality of spaced heat exchange tubes extending substantially horizontally across each of the distilling burning and cooling chambers shortly above the perforated partition therein, a separate heat exchange fluid supply and a heat exchange fluid withdrawal conduit communicating with the set of tubes in said cooling chamber, an external heat exchanger, conduit means connecting said heat exchanger in series with the set of tubes in said distilling chamber on one end and with the set of tubes in the burning chamber on the opposite end a conduit communicating together the remaining opposite ends of the sets of tubes in said distilling and burning chamber thereby providing a closed cyclic circuit for heat exchange flow through the tubes in the burning chamber, the distilling chamber and said external heat exchanger, a circulating pump connected into said closed circuit to cause circulation of the heat exchange fluid therein, a vertical solid material feed duct extending down into said distilling chamber near one lateral end thereof and terminating on its lower end within the lower section of said distilling chamber but a substantial distance above the perforated partition therein, a vertical duct connected between a location in said distilling chamber near its opposite lateral end and a location within said burning chamber near the end thereof which is opposite the lateral end communicating with said cooling chamber, said duct terminating on its upper end above the level of said perforated partition in said burning chamber and terminating on its lower end within the lower section of said burning chamber but a substantial distance above the perforated partition therein, and an outlet duct connecting through the bottom of said cooling chamber near the end thereof opposite the lateral end of communication with said burning chamber, and a flow throttling device on said outlet duct.

HAMILTON P. CALDWELL, Jr.
JOHN W. PAYNE.

REFERENCES CITED

The following references are of record in the file of this patent:

UNITED STATES PATENTS

| Number    | Name          | Date           |
|-----------|---------------|----------------|
| 1,562,550 | Hall          | Nov. 24, 1925  |
| 1,868,512 | Ahlmann       | July 26, 1932  |
| 2,086,561 | Koeppl        | July 13, 1937  |
| 2,152,167 | Ahlmann       | Mar. 28, 1939  |
| 2,311,978 | Conn          | Feb. 23, 1943  |
| 2,320,562 | Bransky       | June 1, 1943   |
| 2,367,281 | Johnson       | Jan. 16, 1945  |
| 2,371,619 | Hartley       | Mar. 20, 1945  |
| 2,381,119 | Dill          | Aug. 7, 1945   |
| 2,387,936 | Nicholls et al. | Oct. 30, 1945 |
| 2,409,234 | Arveson       | Oct. 15, 1946  |
| 2,414,852 | Burnside et al. | Jan. 28, 1947 |
| 2,419,245 | Arveson       | Apr. 22, 1947  |
| 2,431,630 | Arveson       | Nov. 25, 1947  |